United States Patent [19]
Weyeneth

[11] Patent Number: 5,595,430
[45] Date of Patent: Jan. 21, 1997

[54] RESILIENT RETAINER FOR VIBRATION SENSITIVE COMPONENTS

[75] Inventor: Gregory A. Weyeneth, Dearborn, Mich.

[73] Assignee: Ford Motor Company, Dearborn, Mich.

[21] Appl. No.: 411,197

[22] Filed: Mar. 27, 1995

[51] Int. Cl.$^6$ ............................ A47B 88/00; G11B 33/08
[52] U.S. Cl. ........................ 312/319.1; 369/263; 248/626; 248/562
[58] Field of Search .................................. 312/8.1, 223.1, 312/223.2, 319.1; 369/258, 263; 248/562, 581, 589, 610, 626

[56] References Cited

U.S. PATENT DOCUMENTS

| | | | |
|---|---|---|---|
| 1,260,075 | 3/1918 | Shaw | 248/626 X |
| 1,958,778 | 5/1934 | Balduf | 248/626 |
| 2,977,043 | 3/1961 | Scheldorf | 248/610 X |
| 4,553,231 | 11/1985 | d'Alayer de Costemore d'Arc | 369/263 |
| 4,731,777 | 3/1988 | Yishitoshi et al. | 369/263 |
| 4,796,849 | 1/1989 | Fouassier | 248/619 |
| 4,922,478 | 5/1990 | Verhagen | 369/263 |
| 5,042,024 | 8/1991 | Kurosawa et al. | 369/263 X |
| 5,149,066 | 9/1992 | Snaith et al. | 267/136 |
| 5,163,038 | 11/1992 | Arai | 369/263 X |
| 5,347,507 | 9/1994 | Kuhn | 369/263 |

FOREIGN PATENT DOCUMENTS

| | | | |
|---|---|---|---|
| 197159 | 10/1986 | European Pat. Off. . | |
| 570138 | 11/1993 | European Pat. Off. . | |
| 643392 | 3/1995 | European Pat. Off. . | |
| 4035407 | 5/1991 | Germany . | |
| 267792 | 11/1990 | Japan | 369/247 |
| 304405 | 1/1929 | United Kingdom | 312/319.1 |
| 2261105 | 5/1993 | United Kingdom . | |

Primary Examiner—Peter M. Cuomo
Assistant Examiner—James O. Hansen
Attorney, Agent, or Firm—David B. Kelley

[57] ABSTRACT

A vibration sensitive component is mounted within a housing. The mass of the housing is supported by a damper which absorbs a portion of the shock to the component. In addition, a low profile resilient retainer provides a centering force to keep the component from contacting the housing.

10 Claims, 2 Drawing Sheets

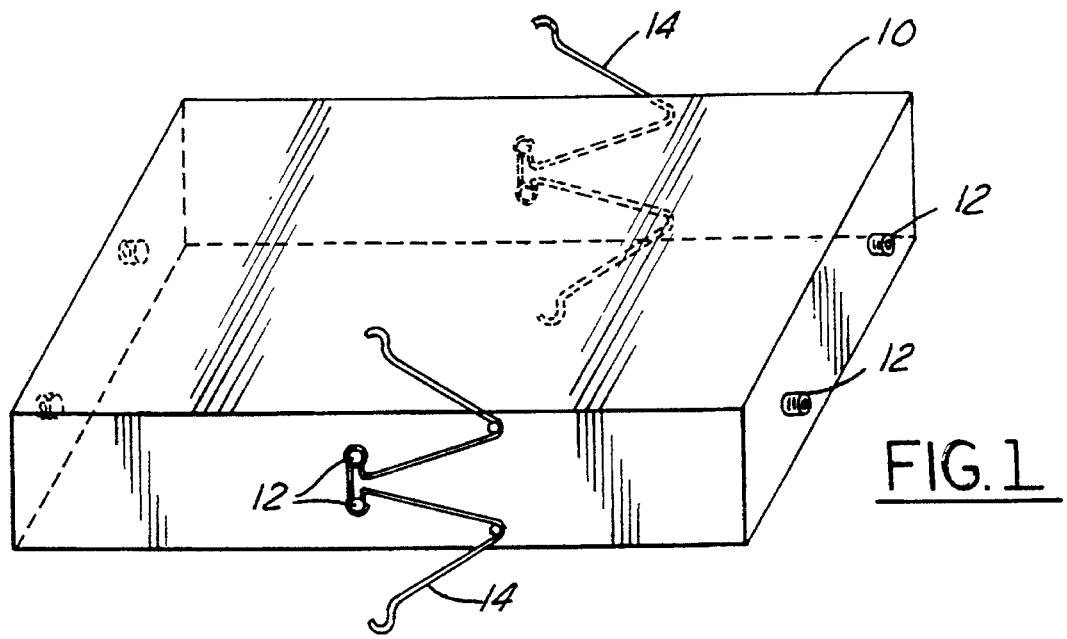
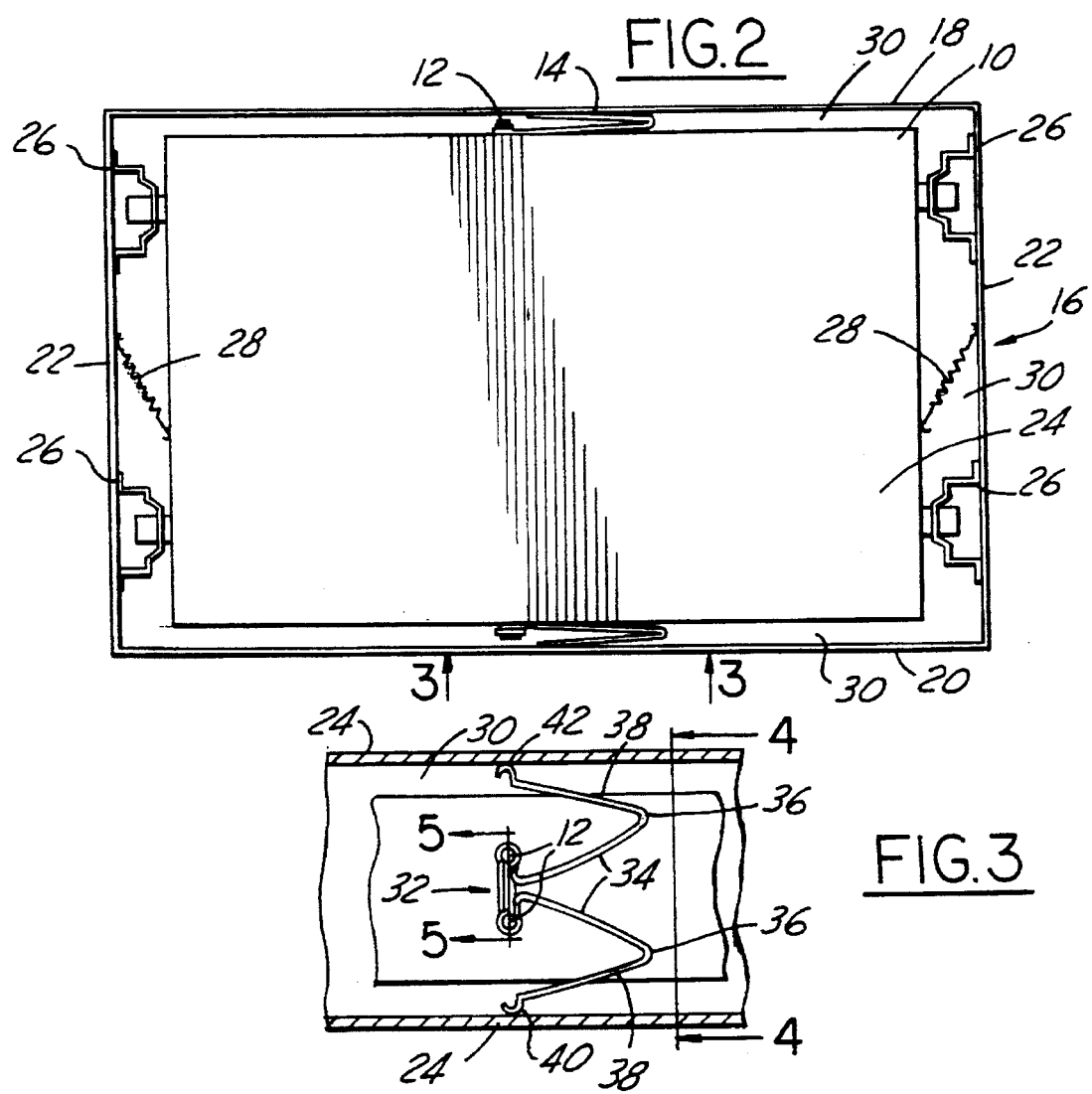

RESILIENT RETAINER FOR VIBRATION SENSITIVE COMPONENTS

BACKGROUND OF THE INVENTION

The present invention relates generally to a mounting for vibration sensitive components. More specifically, the invention relates to mounting a vibration sensitive component in an automotive vehicle to prevent side-to-side motion.

Electronic data storage components, such as CD players and navigation systems, and other vibration sensitive components when used in harsh vibrational environments typically require vibration isolation in their mounting systems. Typically, a combination of energy storage elements such as springs are used in combination with energy dissipative elements such as dampers to support the mass of the component.

In automotive applications, electronic components are mounted within a housing which is mounted within the automobile. One goal of an automotive component designer is to minimize the overall package size of the component to conserve weight and simplify packaging. Examples of electronic data storage components include compact disc players and navigation systems. In one known method of mounting a compact disc player, several helical extension springs on the top and bottom and/or ends of the component are used to suspend the component so that it is vibrationally isolated from the housing into which the component is mounted to allow the optical pickup to accureately track the recorded information. The helical springs however allow the component to have some side-to-side motion. When a compact disc player moves in a side-to-side motion, there is a potential for the compact disc player to contact the housing causing a skip. Preventing a skip is an important design requirement when mounting a compact disc player.

Some methods of mounting a sensitive electronic device to prevent side-to-side movement includes employing additional helical springs and foam padding. However, these methods typically take a relatively large amount of space, which is typically not desirable in an automotive system.

It would therefore be desirable to mount a vibration sensitive component so that side-to-side motion is reduced to prevent the component from contacting the housing using a mechanism that occupies a minimal space.

SUMMARY OF THE INVENTION

One object of the present invention is to provide a cost effective resilient retainer in a reduced package space from mountings typically used in vibration reduction.

The present invention includes a housing for a component having a top portion, a bottom portion and a pair of side walls extending therebetween. A vibration sensitive component is positioned within the housing and has a top, a bottom and a pair of side walls extending therebetween. The vibration sensitive component has at least one mounting pin extending from its bottom. An attachment means mounts the vibration sensitive component within the housing so that a space is formed between the bottom of the vibration sensitive component and the bottom of the housing. A resilient retainer isolates the vibration sensitive component from the side walls. The resilient retainer includes a connection portion for fixedly attaching to at least one mounting pin, and a pair of biasing elements, each of which is mounted between the connection portion and the side walls in the space between the bottom of the vibration sensitive component and the bottom of the housing. The biasing elements each have angularly disposed elements exerting a predetermined centering force between the side wall and the mounting pin.

BRIEF DESCRIPTION OF THE DRAWINGS

FIG. 1 is a perspective view of a vibration sensitive component having a resilient retainer according to the present invention.

FIG. 2 is a cutaway side view of a vibration sensitive component mounted within a housing according to the present invention.

FIG. 3 is a bottom view of a vibration sensitive component mounted within a housing.

DETAILED DESCRIPTION OF THE PREFERRED EMBODIMENT

Figure 4:
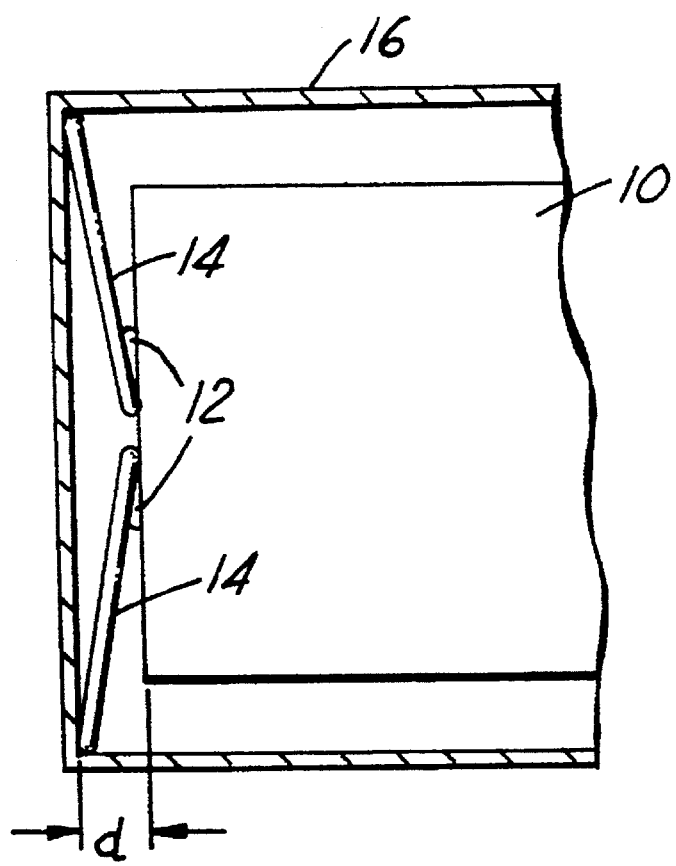
FIG. 4 is a cross sectional view of a mounting for a resilient retainer according to the present invention.

Referring to FIG. 1, a vibration sensitive component 10 such as a compact disc player, on-board navigation system, or other data storage component has a plurality of pins 12 fixedly attached thereto. Pins 12 secure resilient retainer 14 to component 10. Pins 12 are preferably centered on component 10.

Referring now to FIGS. 2 and 3, component 10 is mounted within a housing 16. Housing 16 has a top wall 18, a bottom wall 20, two end walls 22 and two side walls 24 (only one of which is shown in FIG. 2).

An energy dissipative device such as damper 26 and a energy storage device such as helical spring 28 are used to support the mass of component 10 within housing 16 so that a space 30 is formed between component 10 and housing 16.

Resilient retainer 14 is mounted on component to prevent component from contacting housing 16. Resilient retainer 14 may be mounted between any wall of component 10 and any wall of housing 16. Several locations may also be used in combination. For example, a resilient retainer 14 may be mounted on the top of component and the bottom of the component.

As is best seen in FIG. 3, a mounting portion 32 is formed near the center of resilient retainer 14. Mounting portion is formed to be secured to at least one pin 12 and preferably two pins 12. Two V-shaped portions 34 extend downwardly and outwardly from mounting portion 32 in combination generally form a "W"-shaped member. Preferably, V-shaped portions 34 are symmetrical and are used to bias component 10 away from its adjacent wall. Each V-shaped portion 34 has a fulcrum 36 at the vertex of the "V." From each fulcrum 36, a free end 38 extends. Each free end 38 freely engages side wall 24 to prevent side-to-side movement of component 10. Free end 38 may also have a curved portion 40 near its tip. Sometimes it desirable to allow free end 38 to move in relation to side wall 24. Curved portion 40 helps the tip of free end 38 move relative to side wall 24.

Resilient retainer 14 is preferably formed of a single piece of resilient and ductile material such an ASTM music wire type A228 having a diameter of 1.0 mm. In the present example a piece of wire 94 mm long is used. However, the length can vary depending on the application.

As an alternative to letting free ends 38 freely engage side walls, a hold down 42 can be used to retain free end 38 in a fixed relationship to side wall 24. Such a configuration is useful when less freedom in the movement of component 10 is required.

Referring now to FIG. 4, pins 12 are securely connected to component 10. A notched portion 44 preferably integrally formed into pin 12 is used to engage resilient retainer 14.

Figure 5:
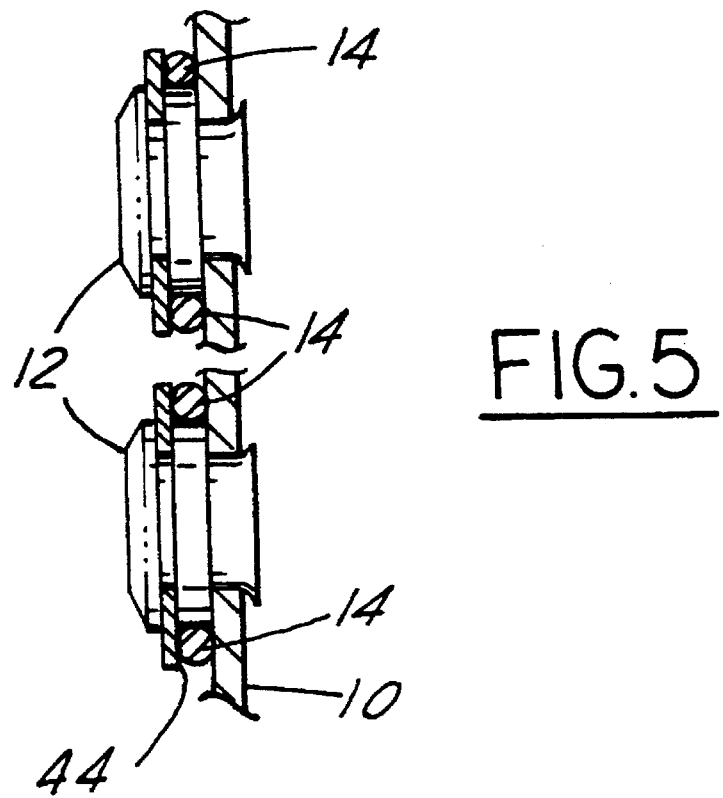
FIG. 5 is an enlarged cutaway view of a resilient retainer according to the present invention.

Referring now to FIG. 5, in the present invention, an undeformed resilient retainer 14 as a vertical distance d between the tip of free end 38 and mounting portion 32 of about 12 mm. The overall width of retainer 14 undeformed is about 74 mm. When resilient retainer 14 is placed within housing 16, it conforms to the dimensions of housing 16 and provides a centering force.

As would be evident to one skilled in the art, several modifications of the invention may be made while still being within the scope of the appended claims. For example, the dimensions of the resilient retainer and the material of the retainer may be changed.

What is claimed is:

1. A vibration sensitive assembly comprising:

a housing having a top portion, a bottom portion and a pair of side walls extending therebetween;

a vibration sensitive component positioned within said housing, said vibration sensitive component having a top, a bottom and a pair of side walls extending therebetween, said vibration sensitive component having at least one mounting pin extending from said bottom;

attachment means mounting said vibration sensitive component within the housing so that a space is formed between said bottom of said vibration sensitive component and the bottom portion of the housing;

at least one resilient retainer isolating said vibration sensitive component from side wall, said resilient retainer including a connection portion for fixedly attaching to said at least one mounting pin, and a pair of biasing elements, each biasing element mounted between said connection portion and said side walls in said space between said bottom of said vibration sensitive component and the bottom portion of the housing, said biasing elements each having a pair or arms each bendable at a fulcrum and having a free end extending therefrom with a curved portion on a distal end thereof in contact with one of said pair of sidewalls, said biasing elements exerting a predetermined centering force between said side wall and said mounting pin.

2. A vibration sensitive assembly as recited in claim 1 wherein each of said biasing elements is mounted between one of said side walls and said bottom.

3. A vibration sensitive assembly as recited in claim 2 wherein each of said biasing elements is fixedly secured between one of said side walls and said bottom.

4. A vibration sensitive assembly as recited in claim 1 wherein said vibration sensitive component comprises a compact disc player.

5. A vibration sensitive assembly as recited in claim 1 wherein said resilient retainer is formed of a unitary structure.

6. A vibration sensitive assembly as recited in claim 1 wherein said vibration sensitive component has two mounting pins on its width.

7. A vibration sensitive assembly as recited in claim 1 further comprising a second resilient retainer mounted between said top of said housing and said top of said vibration sensitive component.

8. A vibration sensitive assembly as recited in claim 1 further comprising a second resilient retainer mounted between one of said walls of said housing and one of said walls of said top of said vibration sensitive component.

9. A vibration sensitive assembly as recited in claim 1 further comprising a second and third resilient retainer mounted between said walls of said housing and one of said walls of said top of said vibration sensitive component.

10. A vibration sensitive assembly as recited in claim 1 wherein said resilient retainer comprises a generally w-shaped member.

* * * * *